(12) United States Patent
Cerutti et al.

(10) Patent No.: US 9,464,678 B2
(45) Date of Patent: Oct. 11, 2016

(54) CALLIPER BODY FOR DISC BRAKE

(71) Applicant: FRENI BREMBO S.P.A., Bergamo (IT)

(72) Inventors: Andrea Cerutti, Bergamo (IT); Davide D'Alessio, Bergamo (IT)

(73) Assignee: FRENI BREMBO S.P.A., Curno (IT)

( * ) Notice: Subject to any disclaimer, the term of this patent is extended or adjusted under 35 U.S.C. 154(b) by 34 days.

(21) Appl. No.: 14/346,045

(22) PCT Filed: Sep. 20, 2012

(86) PCT No.: PCT/IB2012/054995
§ 371 (c)(1),
(2) Date: Jul. 7, 2014

(87) PCT Pub. No.: WO2013/042062
PCT Pub. Date: Mar. 28, 2013

(65) Prior Publication Data
US 2015/0027822 A1   Jan. 29, 2015

(30) Foreign Application Priority Data

Sep. 20, 2011 (IT) ................................ MI2011A1693

(51) Int. Cl.
*F16D 55/228* (2006.01)
*F16D 65/02* (2006.01)
(Continued)

(52) U.S. Cl.
CPC ......... *F16D 65/0075* (2013.01); *F16D 55/228* (2013.01); *F16D 65/0977* (2013.01); *F16D 55/2265* (2013.01); *F16D 2055/002* (2013.01); *F16D 2129/02* (2013.01)

(58) Field of Classification Search
CPC ............. F16D 55/2265; F16D 55/226; F16D 55/228; F16D 65/0068; F16D 65/0075; F16D 2055/0016; F16D 2055/002; F16D 2129/02
See application file for complete search history.

(56) References Cited

U.S. PATENT DOCUMENTS 3,357,523 A * 12/1967 Reed et al. ................. 188/73.38
3,390,744 A *  7/1968 Fawick ........................ 188/72.2

(Continued)

FOREIGN PATENT DOCUMENTS

JP     2010007844 A    1/2010

OTHER PUBLICATIONS

International Search Report and Written Opinion dated Jan. 1, 2015.

*Primary Examiner* — Anna Momper
(74) *Attorney, Agent, or Firm* — Thomas Horstemeyer, LLP (57) ABSTRACT

Calliper body (4) for disk brake having two elongated elements (5 and 6) on opposite sides of the disk and suitable for supporting and pressing pads (13 and 14) against the disk (2), each of said 'elongated bodies (5 and 6) comprising an exit portion (97) of thrust means suitable for facing one of said pads (13, 14), each of said exit portions (97) having a boundary (96) delimited on the opposite side to the rotation axis (9) by an upper boundary (98) which borders a radially outer portion (21, 22) of the elongated body, said calliper body (4) having at least one connection bridge (3) with an inner bridge side (30, 31) facing towards the calliper body, said radially outer portion being divisible, along its direct tangential extension parallel to the circumferential direction, into three substantially equal sections (23, 24, 25 or 26, 27, 28), of which two lateral sections (23 and 25 or 26 and 28) and one interposed central section (24, 27), wherein said calliper body (4) comprises at least one reinforcement element (41, 42, 43, 44) suitable for firmly connecting one said inner bridge side (30, 31) to one said central section (24, 27) of the adjacent radially outer portion (21, 22), said at least one reinforcement element at least partially surmounting said upper boundary (98) and said pads (13 and 14); and wherein the crossing of the projection in a direction parallel to the axial direction (9) of the central section (24, 27) of the radially outer portion (21, 22), with the projection in a circumferential direction of the central section (33, 36) of the bridge side (30, 31), defines a radial through aperture (20) which places the space between the elongated bodies (5,6) in communication with the outside of the calliper body (4) so as to permit the outflow of hot air from inside the calliper body (4) outwards.

18 Claims, 4 Drawing Sheets

(51) Int. Cl.
*F16D 65/00* (2006.01)
*F16D 65/097* (2006.01)
*F16D 55/2265* (2006.01)
*F16D 55/00* (2006.01)
*F16D 129/02* (2012.01)

(56) References Cited

U.S. PATENT DOCUMENTS

2008/0023276 A1 1/2008 Schorn
2010/0170755 A1 7/2010 Biggs

\* cited by examiner

CALLIPER BODY FOR DISC BRAKE

CROSS-REFERENCE TO RELATED APPLICATION

This application is the 35 U.S.C. §371 national stage of PCT Application No. PCT/IB2012/054995, entitled "Calliper Body for Disc Brake" and filed Sep. 20, 2012, which is herein incorporated by reference in its entirety and which also claims priority to, and the benefit of, Italian Application No. MI2011A001693, filed Sep. 20, 2011, which is herein incorporated by reference in its entirety.

The present invention relates to a brake calliper of the type comprising a calliper body placed astride a disk brake, wherein said disk comprise a rotation axis and opposite friction surfaces. The calliper body defines a disk space which the disk is partially housed in. The body placed astride comprises two elongated elements placed on opposite sides in relation to the disk and defining the aforesaid space for the disk and connected to each other by a bridge portion. The elongated elements comprise seats for pistons suitable for acting in compression towards the opposite surfaces of the disk and co-operating with callipers suitable for being operatively pressed against the friction surfaces of the disk to perform braking, depending on the command of the vehicle driver. One of the elongated elements, in particular the one positioned on the side of the vehicle is fitted integral with and constrained to the vehicle both in translation and rotation.

As it is known, during braking, the pistons press the pads against the friction surfaces of the disk giving rise to a friction force substantially parallel to the disk surfaces, and therefore substantially tangential to the disk. Such force generates a reaction on the calliper body which is subject to a shear strain and a torque which are distributed between the elongated elements and the connection bridge. In addition, by the braking action itself in which the pistons press with force substantially perpendicular to the friction surfaces of the disk, the calliper body receives a reaction perpendicular to the disk, which tends to open the calliper body or to distance the elongated elements from the friction surfaces. As a result of both the stresses, the calliper body tends to deform elastically concentrating most of the torsion stress in the connection bridge between the elongated elements of the calliper body.

The aforementioned elastic deformation of the calliper body during a braking action has the disadvantage of an uneven stress of the pad on the friction surfaces of the disk and a misalignment of the same. This results in the disadvantage that one portion of the pad is pressed with a different force compared to another portion of the pad, producing a friction force which is different from that desired. Moreover, the most stressed portion of the pad tends to wear faster than that which is less stressed, giving rise to uneven wear and also causing uneven wear of the disk.

In extreme cases of irregular force peaks, for example due to occasional impulses caused by an uneven road surface during a braking action, these may even cause plastic deformation of the connection bridge, making the calliper body unserviceable.

The distribution of the stresses in the connection bridge between the elongated elements is further worsened by the presence of an aperture, often present in the prior brake callipers, able to allow and facilitate a flow of cooling air along the friction surfaces of the disk and the pads so as to cool the parts rubbing together with friction so as to keep the various parts composing the brake, and also the brake fluid, below a threshold temperature which alters its behaviour.

Often, such flow of air is generated by the rotation of the disks and by the movement of the vehicle in relation to the road, supplying in particular an escape route of the cooling air coming out radially from disks of the so-called "ventilated" type, having two disks facing one another with an interspace between them in order to permit a flow of air towards the periphery.

Such known devices have the disadvantage of not reacting in a sufficiently rigid manner to the braking action, but of presenting an appreciable elastic deformability, substantially concentrated in the connection bridge giving rise to deformation by torsion of the brake calliper and consequent irregular progress of the braking action.

From the document US 2008/0185243 in the name of the same applicant, a brake calliper attachable to a support structure of a vehicle placed astride a disk brake having opposite braking surfaces is known, comprising a first half on the side of the support structure and a second half on the wheel side. At least one of such halves comprises at least one seat having a main direction which defines an axial direction for a pressing element adapted to co-operate with a brake pad to exert a braking action against the disk surfaces and the calliper body comprises at least one bridge element suitable for structurally connecting the first and second half of the calliper body. The at least one bridge element defines a substantially longitudinal main extension direction inclined by a preset angle in relation to the axial direction of the seat of the pressing element.

Despite such device having considerable rigidity to mechanical stresses, the need to provide as wide an aperture as possible is felt.

The applicant has therefore felt the need to propose a calliper body for disk brakes, having two elongated elements and a connection bridge between the elongated elements, having an aperture, which is able to overcome the drawbacks presented in relation to the prior art and able to react rigidly to the shear and torsion stresses deriving from the braking action, having high torsional and axial rigidity and a high rigidity/weight ratio.

It is therefore the purpose of the present invention to provide a brake calliper able to limit the deformation of the calliper body when stressed by a braking action, and at the same time, to permit the evacuation of the heat generated by the rubbing with friction between friction surfaces of the disk and pads.

These and further purposes and advantages are achieved by a calliper body for disk brakes as described in claim 1 hereto attached. Preferred embodiments are disclosed in the appended dependent claims.

According to a general embodiment of the present invention a calliper body for disk brakes is provided, suitable for being placed astride a disk brake having opposite braking surfaces and predefined rotation axis defining an axial direction X-X, an orthogonal radial direction R-R and a circumferential direction T-T orthogonal to the axial direction and to the radial direction.

In particular, the calliper body has two elongated elements suitable for being positioned on opposite sides of the disk, facing the braking surfaces of the disk and suitable for supporting and pressing pads against said braking surfaces of the disk, said pads having a pad, boundary each of said elongated elements comprising an exit portion of thrust means suitable for facing a respective one of said pads, each of said exit portions having a boundary suitable for adopting the same shape as the boundary of the facing pad delimited by the side opposite the rotation axis of an upper boundary which borders with a radially outer portion of the elongated body positioned in relation to the exit portion of the thrust means on the side opposite the rotation axis.

The aforesaid exit portion represents a thrust seat for receiving thrust means suitable for pressing a pad against a braking surface.

In particular, the calliper body has at least one connection bridge which with its ends connects the elongated elements to each other, having an inner bridge side facing towards the calliper body substantially transversal to the adjacent radially outer portion.

The radially outer portion is divisible along its tangential extension parallel to the circumferential direction, into three substantially equal sections, of which two lateral sections and one interposed central section, wherein said inner bridge side is divisible, in a direction parallel to the axial direction, into three substantially equal sections, of which two lateral bridge sections and one interposed central section.

Advantageously, the calliper body comprises at least one reinforcement element suitable for firmly connecting one said inner bridge side to one said central section of the adjacent radially outer portion, said at least one reinforcement element at least partially overlying said upper boundary so as to partially overlying said pads.

In other words, the reinforcement element (41,42, 43,44) is radially external to the upper boundary (98).

Moreover, advantageously, the crossing of the projection in a direction parallel to the axial direction of the central section of the radially outer portion, with the projection in a circumferential direction of the central section of the bridge side, defines a radial through aperture which allows the space between the elongated bodies to be in communication with the outside of the calliper body so as to allow the hot air from the inside of the calliper body to flow outwards.

Moreover, such arrangement makes it possible to provide the calliper body with high mechanical resistance to the stresses deriving from a braking action and, at the same time, to provide an wide aperture for the evacuation of the heat generated by the friction between the surfaces rubbing during braking.

Further purposes, solutions and advantages are present in the embodiments described below and claimed in the appended dependent claims.

Different embodiments of the invention are described below by means of embodiment examples, made by way of non-limiting examples with reference in particular to the appended drawings wherein.

Hereinafter reference will be made to an "axial direction" to indicate a direction coinciding with or parallel to the rotation axis of the disk brake; "hub direction" to indicate the side or direction facing the hub or the inside of a vehicle; "wheel direction" to indicate the side or direction facing the wheel of a vehicle; "radial direction" to indicate a direction coinciding with or parallel to a radial direction of the disk brake, orthogonal to the axial direction; "circumferential direction" to indicate a direction tangent to the circumference of the disk rim, such direction being orthogonal to the axial direction and to the radial direction; "extraction" or "advancement" or "exit" to indicate the direction of the path of the piston coming out of its seat provided in the calliper body; "rearward movement" or "recall" or "return" to indicate the direction of the path of the piston going into its seat provided in the calliper body; to "pad boundary" to indicate the projection of the pad on a plane orthogonal to the exit direction of the piston.

With reference to the figures, a calliper for disk brake comprising a calliper body 4 of the type placed astride a disk brake 2, is globally denoted by reference numeral 1.

Such calliper body has two elongated elements 5 and 6 positioned substantially parallel on opposite sides in relation to the disk and defining between them a disk space to partially house the disk brake 2. The elongated elements 5 and 6 can be joined to each other by at least one connection bridge 3 which remains operatively facing the disk. The connection bridge 3 connects the elongated elements 5 and 6 along a peripheral portion of the same in relation to the rotation axis of the disk 2. The elongated elements 5 and 6 are provided with thrust means on opposite sides to the braking surfaces 18 and 19 of the disk, for pushing the pads 13 and 14 against said disk 2 so as to contrast the rotation of the disk by friction which is integral with a wheel of the vehicle, thereby braking. The means of pushing the pads 13 and 14 against the opposite friction surfaces of the disk 2, generally comprise pistons housed in respective seats 90 in the elongated bodies 5 and 6, operable in a direction parallel to the axial direction of the disk 2, wherein such pistons are actuated by the pressure of a brake fluid commanded by the vehicle driver to perform braking.

The calliper body comprises attachment portions 60 able to firmly and rigidly fit the calliper body 4 to the chassis of the vehicle. Such attachment portions 60 to the vehicle may comprise holes 61 suitable for housing connection screws or pins to the vehicle.

The connection bridge 3 may have an aperture 20 positioned radially to the disk 2 and passing through the connection bridge 3. Such aperture 20 has the purpose of permitting the cooling of the pad 13 and 14 and disk brake 2 surfaces in contact by rubbing during braking, by means of the possibility of evacuating the hot air deriving from such friction, through such aperture 20. In fact such aperture is positioned along the evacuation flow of the braking hot air.

Each of the elongated bodies 5 and 6 comprises an exit portion 97 of the thrust means, in particular thrust pistons, suitable for facing a respective pad 13 or 14, each of said exit portions 97 having a boundary 96 suitable for adopting the same shape as the boundary of the facing pad 13, 14, delimited on the opposite side with respect to the rotation axis 9, by an upper boundary 98 which borders with a radially outer portion 21, 22 of the elongated body placed on the opposite side of the rotation axis 9 in relation to the exit portion 97 of the thrust means.

In other words, the reinforcement element (41, 42, 43, 44) is radially external to the upper boundary (98).

The aforesaid exit portion 97 represents a thrust seat for receiving thrust means suitable for pressing a pad against a braking surface.

According to one embodiment, such exit portion 97, is for example formed of a flat inner wall and internally delimits a seat suitable for housing a pad 13 or 14, said seat being delimited, in addition, by side walls 99 which extend from such inner wall starting from the boundary 96 which partially copies the boundary of the pad, and together with an inner surface of the reinforcement elements 41, 42, 43 and 44 facing towards the disk 2, which extends starting from the upper boundary 98.

The aperture 20 may have a closed contour, remaining therefore surrounded by the calliper body 4.

Such closed contour may be formed of two radially opposite external portions 21 and 22 which extend substantially parallel to the elongated elements 5 and 6, and two inner sides of opposite bridges 30 and 31 which extend substantially transversally to the elongated elements 5 and 6. The side 21 is adjacent to the sides 30 and 31, the side 22 is adjacent to the sides 30 and 31 on the side opposite to side 21. For example such aperture may be a rectangular shape.

Each side of such aperture is divisible into three substantially equal parts: the side 21 is divisible into a central portion 24 and two lateral portions 23 and 25, the side is divisible into a central portion 27 and two lateral portions 26 and 28, the side 30 is divisible into a central portion 33 and two lateral portions 32 and 34, the side 31 is divisible into a central portion 36 and two lateral portions 35 and 37.

Advantageously, the calliper body 4 comprises at least one reinforcement element 41, 42, 43, 44 of the aperture 20, having opposite attachment portions firmly connected to respective attachment areas of said aperture, along one of the radially outer portions 21, 22 and one of the inner bridge sides 30, 31 adjacent to each other.

The aforesaid attachment zones extend on a lateral portion 23, 25, 26, 28 and/or at least partially on a central portion 24, 27 of one of the radially outer portions 21, 22 and on a lateral portion 32,34, 35,37 of one of the inner bridge sides 30, 31 and/or at least one central portion 33, 36 of one of the inner bridge sides 30, 31.

In other words, the reinforcement elements connect two adjacent sides of the aperture 20 to each other so as to prevent or limit the relative rotation of such sides, countering the effect of elastic deformation of the calliper body in an area of the calliper body weakened on account of the presence of the aperture.

Such reinforcement elements have a contrasting effect on the deformation of the calliper body, such contrasting effect being positioned obliquely in relation to the two sides of the aperture adjacent to each other to which the reinforcement element is firmly connected.

In other words, in the case in which four reinforcement elements are present in the four angles formed between the four sides of the aperture, two reinforcement elements in two opposite angles work in compression (as struts) and the other two reinforcement elements in the other two angles of the aperture work by traction (as connecting rods).

In one embodiment of the calliper body four connection elements are present wherein: the connection element 41 connects the side 30 to the side 21 and extends on a side portion 23 and also on a central portion 24 of the side 21 and on a part of the lateral portion 34 of the side 30; the connection element 42 connects the side 31 to the side 21 and extends on a side portion 25 and also on a central portion 24 of the side 21 and on a part of the lateral portion 37 of the side 31; the connection element 43 connects the side 31 to the side 22 and extends on a side portion 28 and also on a central portion 27 of the side 22 and on a part of the lateral portion 35 of the side 31; the connection element 44 connects the side 30 to the side 22 and extends on a side portion 26 and also on a central portion 27 of the side 22 and on a part of the lateral portion 32 of the side 30.

In such embodiment therefore, each connection element 41, 42, 43, 44 extends by more than one-third of a radially outer portion 21, 22 of the aperture 20 and by less than one-third of a bridge side 30, 31 adjacent to the radially outer portion of the aperture 20.

For example, according to a possible embodiment, the connection elements 41, 42, 43, 44 extend overall substantially for 84% of the length of each radially outer portion 21 and 22 in a circumferential direction, and overall substantially for 55% of the length of each bridge side 30 and 31 in a direction parallel to the axial direction 9.

In one embodiment, the reinforcement elements 41, 42, 43, 44 are positioned symmetrically in relation to a central point of said aperture 20. This way a substantially even distribution of the forces in the calliper body 4 is achieved.

According to one embodiment, the at least one reinforcement element 41, 42, 43, 4.4 is a triangular plate having the cathetuses firmly connected to one of the radially outer portions 21 or 22 and one of the inner bridge sides 30, 31 adjacent to the radially outer portion of the aperture 20. This way, the at least one reinforcement element has an edge 65 facing towards the aperture 20, wherein such edge 65 is rectilinear and oblique in relation to the sides of the aperture.

According to another embodiment, the edge 65 of the at least one reinforcement element may be concave to the centre 50 of the aperture 20

According to one possible embodiment, the at least one reinforcement element 41, 42, 43, 44 has for example a thickness in a radial direction of 3 to 10 mm.

In other words, the reinforcement element (41, 42, 43,44) comprises a reinforcement wall (40) having a radial thickness less than the radial thickness of said connection bridge (3).

According to one embodiment of the calliper body the at least one reinforcement element radially overlies least one portion of a pad and/or disk 2, partially surrounding a peripheral portion of a pad and/or disk 2.

Figure 1:
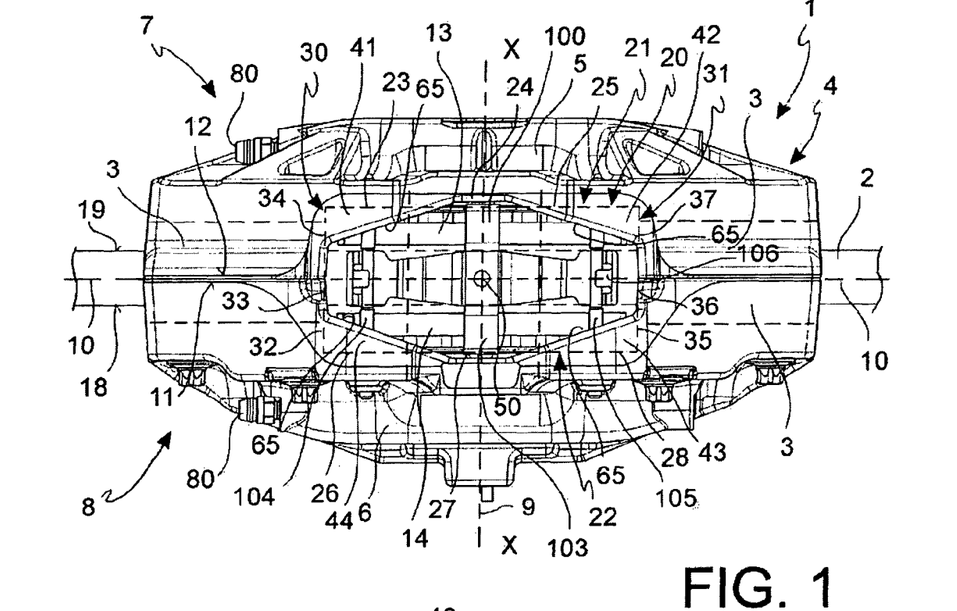
FIG. 1 shows a view in a radial direction of a disk brake having a calliper body with a radial aperture having reinforcement elements.
Figure 2:
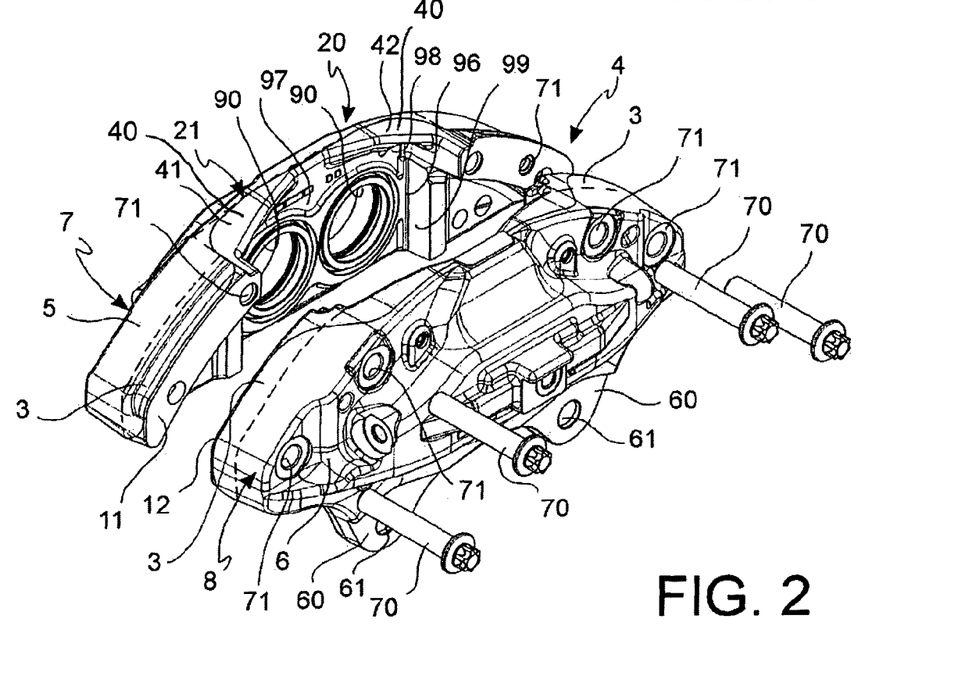
FIG. 2 shows an exploded view of, a calliper body formed of two coupling parts and having a radial aperture with reinforcement elements.
Figure 3:
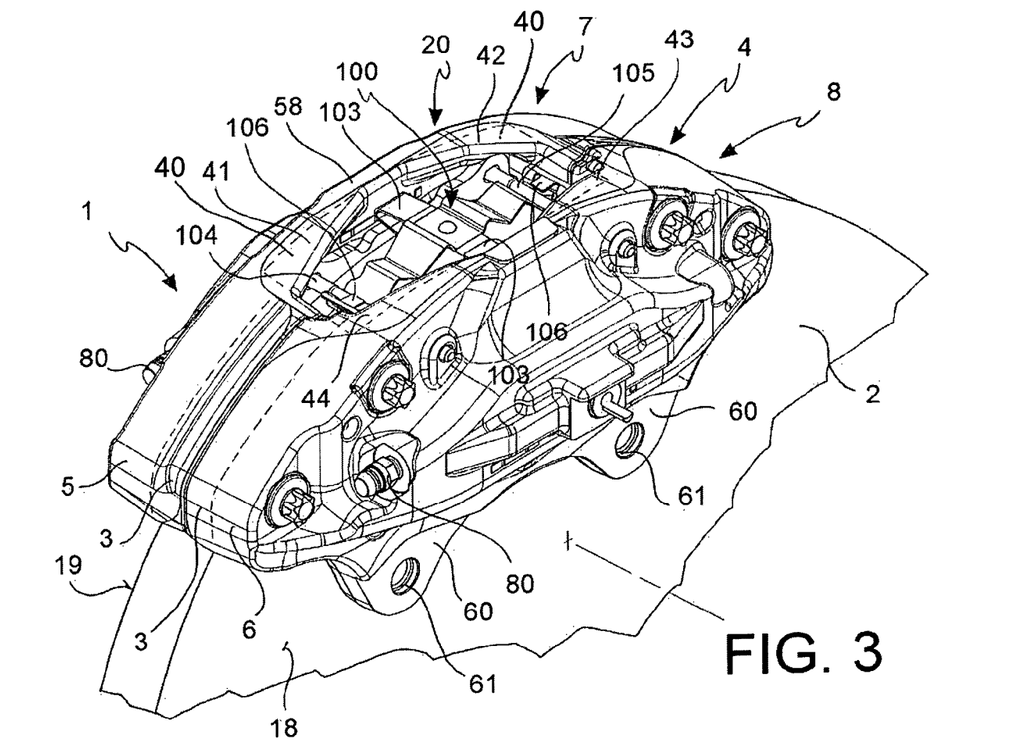
FIGS. 3 and 4 respectively show two perspective views from different angles of a disk brake having a radial aperture with reinforcement elements.
Figure 4:
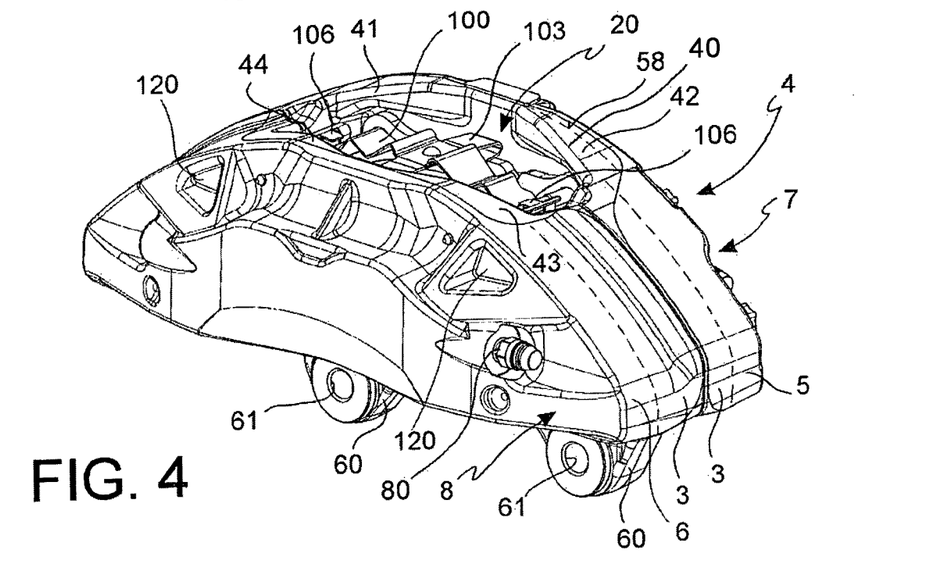
Figures 5, 6:
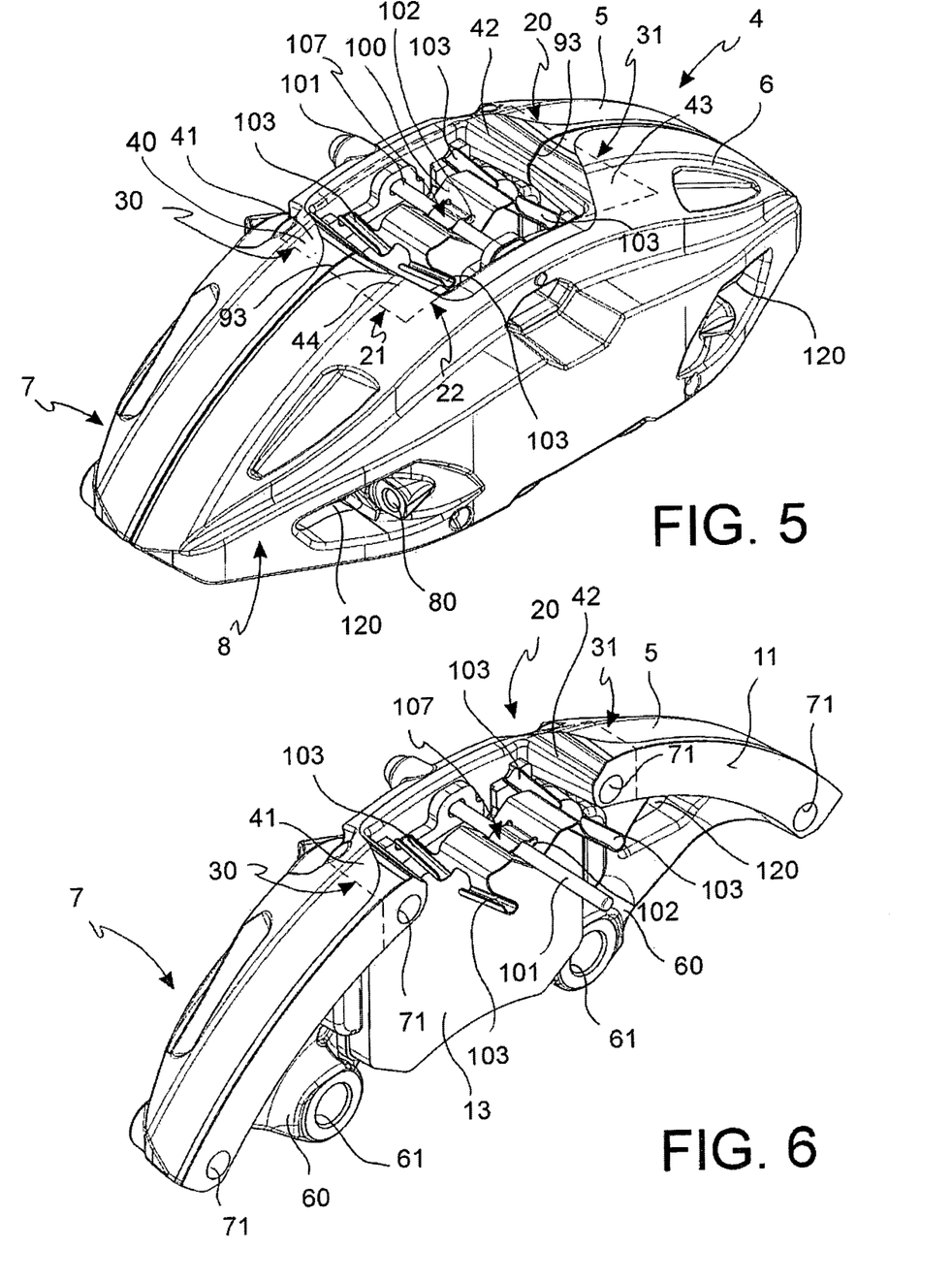
FIG. 5 shows in a perspective view a disk brake comprising a further embodiment of a calliper body having an aperture with reinforcement elements.
FIG. 6 shows in a perspective view half of a disk brake comprising such further embodiment of a calliper body.
Figure 7:
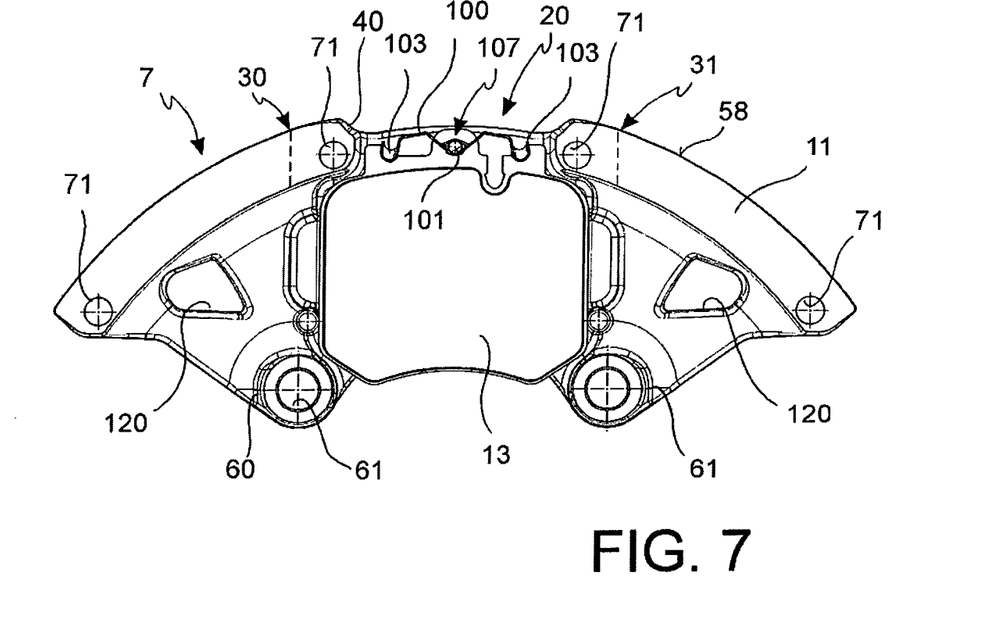
FIG. 7 shows a view from a direction parallel to the disk axis, of such embodiment of a calliper body.
Figure 8:
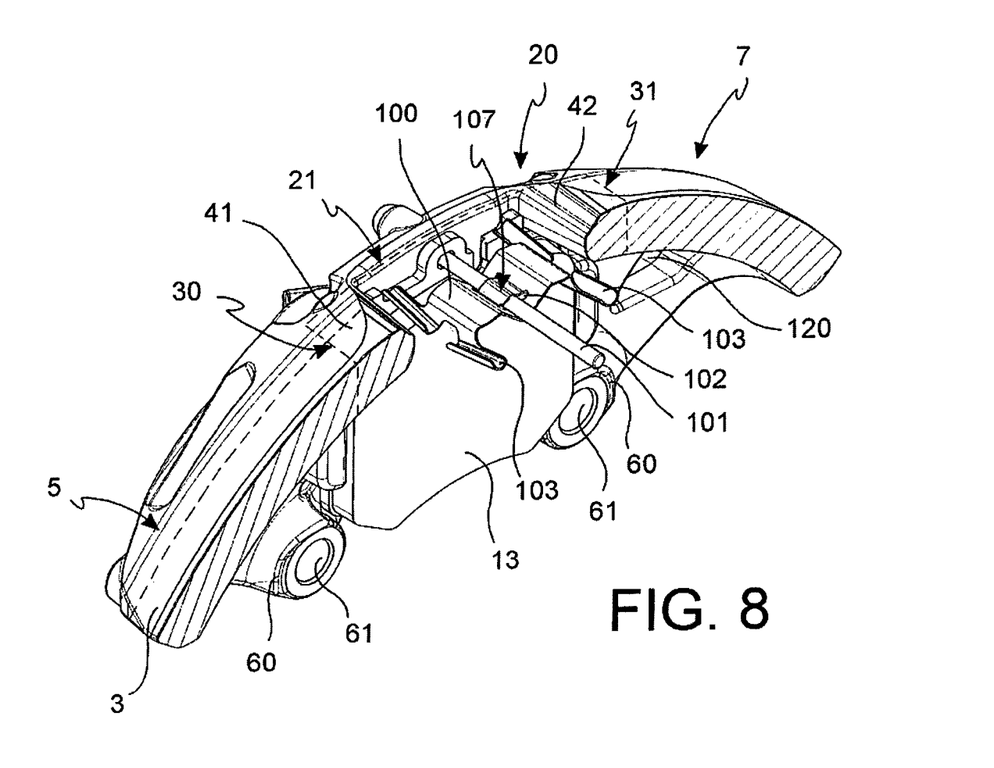
FIG. 8 shows a perspective view of a section with a plane perpendicular to the disk axis of another embodiment of a disk brake having a calliper body with aperture having reinforcement elements.

According to an alternative embodiment of the calliper body, shown in FIGS. 5 to 8, the calliper body 4 comprises four reinforcement elements 41, 42, 43, 44 of the aperture 20, firmly connected to respective attachment zones of the aperture, along the radially outer portions 21 and 22 and along the inner bridge sides 30 and 31 wherein the attachment zones extend at least partially on a said lateral portion 23, 25, 26, 28 and on a whole lateral portion 32, 34, 35,37 and on a central portion 33, of one of the inner bridge sides 30,31 wherein the reinforcement elements 41 and 44 and the reinforcement elements 42 and 43 extend towards each other until their reciprocal contact, and have respective contact surfaces 93. Moreover, the calliper body 4 may comprise connection means between the reinforcement elements 41 and 44 and the reinforcement elements 42 and 43, for example such means being threaded pins 70.

In other words, such alternative embodiment leads to a reduction of the breadth of the aperture in a direction parallel to the elongated elements 5 and 6.

According to one embodiment, the at least one reinforcement element 41, 42, 43, 44 is obtained in one piece with the calliper body 4.

In other words, the reinforcement elements may be integrally connected to the calliper body, forming part of said calliper body itself and defining the aperture 20. Such reinforcement elements may be obtained by a casting process together with the calliper body, in one piece with the calliper body 4. Such reinforcement elements may then be subsequently processed together with the calliper body to achieve the final shape required as a result of the encumbrances of the various disk brake components.

According to one alternative embodiment, the reinforcement elements 41, 42, 43, 44 may be an elongated shape and obtained separately from the calliper body 4 and subsequently firmly connected to the sides of the aperture 20 by connection means, chosen from screws, interference pins, geometric shaped couplings, rivets, welding, glue.

According to one embodiment of the calliper body 4, the connection bridge 3 between the elongated elements 5 and 6 of the calliper body 4, is delimited, on the side opposite the disk 2, by an outer surface 58, such that the connection bridge 3 and the at least one reinforcement element are flush with the outer surface 58.

In a possible embodiment, the calliper body 4 may envisage a spring 100 which can be fitted in said calliper body and suitable for keeping the pads 13 and 14 in an operative position.

Such spring 100 may be made from elastic plate, for example in pre-stressed steel, sheared and shaped so as to present engagement means to the calliper body 4 and free ends 103 suitable for being placed in contrast with said pads 13 and 14.

According to one embodiment, the aforesaid engagement means to the calliper body may comprise at least one shaped end 106 of said spring 100. Couplable with an at least one support pin 104 and 105 having ends engaged by opposite sides of the calliper body and positioned in a substantially axial direction, at the aperture 20.

According to another embodiment, the engagement means of the spring 100 to the calliper body may comprise a single support pin 101 having ends engaged with the calliper body, positioned substantially centrally to the aperture 20, in a direction parallel to the axial direction, said pin being engaged in a tunnel by means of the spring 100, obtained by means of two holes 102, of which an entrance hole and an exit hole for the pin, and a raised deformed portion 107, said deformed portion being obtained by plastic deformation of the sheeting forming the spring.

According to one embodiment, the spring 100, may be made as a single piece from plate by shearing and moulding.

Such a spring 100 has the advantage of being produced through a reduced number of processing steps, and in a very short time, enabling ample production in series by automated means, thereby leading to considerably reduced production costs.

According to one embodiment, the calliper body 4 comprises at least one through hole 120; which traverses at least one elongated body 5, 6 in a direction substantially parallel to the axial direction. Such hole has the function of permitting an evacuation flow of the air which heats as a result of the friction of the braking.

In one embodiment, each elongated element 5 and 6 comprises two through holes 120, facing towards the braking surface of the disk.

According to one embodiment, the calliper body 4 comprises a first half-calliper 7 and a second half-calliper 8, fitting to each other in a complementary manner in contact with each other along a respective first facing surface 11 and a second facing surface 12, and the aperture being astride the first and second half-callipers 7 and 8.

According to one embodiment, the first and second facing surfaces 11 and 12 are flat and positioned along an intermediate separation plane 10 and equidistant from the elongated portions 5 and 6, the aperture 20 being cut in half by said plane 10.

To fitting the first and second half-callipers 7 and 8 together, attachment means may be provided, for example threaded pins 70, or screws, engaged in respective holes 71 in the two parts of the calliper body 7 and 8, positioned in directions parallel to the axial direction.

In a second embodiment of the invention, a brake calliper is envisaged comprising a calliper body having an aperture 20 with reinforcement elements 41, 42, 43, 44 as described above.

According to a second general embodiment of a calliper body the aforesaid purposes are achieved by a calliper body 4 for disc brake 1 suitable for being placed astride a disk brake 2 having opposite braking surfaces and predefined rotation axis defining a transversal direction radial to the disk and a transversal circumferential direction, said calliper body 4 having two elongated elements 5 and 6, suitable for being positioned on opposite sides in relation to the disk 2 and suitable for supporting and pressing pads 13 and 14 against said braking surfaces of said disk 2, each of said elongated bodies 5 and 6 comprising an exit portion 97 of thrust means suitable for facing one respective of said pads 13, 14, each of said exit portions 97 having a boundary suitable for having the same shape as the boundary of the facing pad 98, delimited on the opposite side to the rotation axis by an upper boundary which borders with a radially outer portion 21, 22 of the elongated body placed on the opposite side of the rotation axis 9 in relation to the exit portion 97 of the thrust means, said calliper body 4 having at least one connection bridge 3 which with its ends connects the elongated elements to each other, having an inner bridge side facing towards the calliper body substantially transversal to the adjacent radially outer portion 21, 22 and being divisible, along its tangential extension parallel to the circumferential direction, into three substantially equal sections, of which two lateral sections and one interposed central section, and each inner bridge side 30, 31 being divisible, in a direction parallel to the axial direction, into three substantially equal sections, of which two lateral sections 32, 34 and 35, 37 and one interposed central section 33, 36.

According to one embodiment, said calliper body 4 comprises at least one reinforcement element 41, 42, 43, 44 suitable for firmly connecting said central section 33, 36 of said inner bridge side 30, 31 to at least one said lateral section 23, 25, 26, adjacent to said radially outer portion 21, 22, said at least one reinforcement element at least partially overlying said upper boundary 98 and said pads 13 and 14.

In other words, the reinforcement element (41,42,43,44) is radially external to the upper boundary (98).

Moreover, according to one embodiment, the crossing of the projection in a direction parallel to the axial direction 9 of the central section 24 and 27 of the radially outer portion 21 and 22, with the projection in a circumferential direction of the central section 33 and 36 of the bridge side 30 and 31 delimits an area which is free of obstruction for a free outflow of air from inside the calliper.

For example, the reinforcement element may be in one piece with said elongated element 5, 6.

A person skilled in the art may make numerous modifications, adaptations and variations of elements with others functionally equivalent to the preferred embodiment solution of the device described above so as to satisfy contingent and specific requirements while remaining within the scope of the invention as defined by the following claims.

We claim:

1. Calliper body for disk brake suitable for being positioned astride a disc brake, wherein the disk brake includes a disk having two braking surfaces and defines a rotation axis as well as an axial direction parallel to the rotation axis, an orthogonal radial direction and a circumferential direction orthogonal to the axial direction, said calliper body having two elongated bodies suitable for being positioned on opposite sides of the disk and facing said braking surfaces, each of said elongated bodies comprising a thrust seat for housing thrust means suitable for pressing a pad, against one of the braking surfaces, each of the thrust seats having a rim of a substantially complementary shape to the shape of a pad rim of the pad, each elongated body having a radially outer portion;

wherein said rim of the thrust seat comprises an upper boundary which separates the thrust seat from the radially outer portion;

said calliper body having a connection bridge which connects the elongated bodies, said calliper body comprising at least one reinforcement element which connects said radially outer portion to said connection bridge, said radially outer portion and said at least one reinforcement element defining a through radial aperture having a maximum length in a circumferential direction and a maximum width in an axial direction, wherein:

the at least one reinforcement element is radially external to the upper boundary; and the at least one reinforcement element comprises a reinforcement wall having a radial thickness less than the radial thickness of said connection bridge.

2. Calliper body according to claim 1, wherein the connection bridge comprises an inner bridge side facing towards the disk and which extends in a direction substantially transversal to the radially outer portion and said radially outer portion has a central section and two lateral sections of a breadth substantially equal to that of the central section, wherein the reinforcement wall has an inner edge which extends from the central section of the radially outer portion, to the inner bridge side.

3. Calliper body according to claim 1, wherein the connection bridge comprises an inner bridge side facing towards the disk and which extends in a direction substantially transversal to the radially outer portion, said radially outer portion has a central section and two lateral sections of a length substantially equal to that of the central section said inner bridge side has a central section and two lateral sections of a length substantially equal to that of the central section, wherein the reinforcement wall has an inner edge which extends between the central section of said inner bridge side and a lateral section of said radially outer portion, adjacent to said inner bridge side.

4. Calliper body according to claim 3, wherein the inner edge of the reinforcement wall is substantially rectilinear.

5. Calliper body according to claim 3, wherein the through radial aperture is defined by the crossing of a projection in a direction parallel to the axial direction of the central section of the radially outer portion, with the projection in a circumferential direction of the central section of the inner bridge side, said through radial aperture allowing the space between the elongated bodies to be in communication with the outside of the calliper body.

6. Calliper body according to claim 3, wherein the inner edge of the reinforcement wall extends between the central section of the radially outer portion and an adjacent lateral section of said inner bridge side.

7. Calliper body according to claim 1, wherein said at least one reinforcement element at least partially overlies said thrust means.

8. Calliper body according to claim 1, wherein the at least one reinforcement element includes four reinforcement elements, each of the four reinforcement elements each firmly connected to a respective one of said radially outer portion and an adjacent one of said inner bridge side.

9. Calliper body according to claim 1, wherein said at least one reinforcement element has a symmetrical shape in relation to a central point equidistant between two opposite inner bridge sides and two opposite radially outer portions.

10. Calliper body according to claim 1, wherein said at least one reinforcement element is made in one piece with said calliper body.

11. Calliper body according to claim 1, wherein said at least one reinforcement element is a triangular plate having the cathetuses firmly connected to one of the radially outer portion and one of said inner bridge side adjacent to said radially outer portion of said aperture.

12. Calliper body according to claim 1, wherein said connection bridge between the elongated bodies of the calliper body, is delimited on the opposite side with respect to the disk, by an outer surface, said connection bridge and said at least one reinforcement element being flush with said outer surface.

13. Calliper body according to claim 1, wherein the calliper body comprises a first half-calliper and a second half-calliper, fitting to each other in a complementary manner in contact with each other along respective first and second facing surfaces, said aperture being astride between said first and second half-callipers.

14. Calliper body according to claim 13, wherein said first and second facing surfaces are flat and positioned along an intermediate separation plane and equidistant from the elongated bodies, said aperture being cut in half by said plane.

15. Calliper for disk brakes comprising a calliper body having the characteristics of claim 1.

16. Calliper body according to claim 1, wherein the at least one reinforcement element extends by more than one-third of the radially outer portion of the aperture and by less than one-third of an inner bridge side adjacent to the radially outer portion of the aperture.

17. Calliper body according to claim 1, wherein the at least one reinforcement element extends overall substantially for 84% of the length of a radially outer portion in a circumferential direction, and overall substantially for 55% of the length of an inner bridge side in a direction parallel to the axial direction.

18. Calliper body for disk brake suitable for being positioned astride a disc brake, wherein the disk brake includes a disk having two braking surfaces and defines a rotation axis as well as an axial direction parallel to the rotation axis, an orthogonal radial direction and a circumferential direction orthogonal to the axial direction, said calliper body having two elongated bodies suitable for being positioned on opposite sides of the disk and facing said braking surfaces, each of said elongated bodies comprising a thrust seat for housing thrust means suitable for pressing a pad, against one of the braking surfaces, each of the thrust seats having a rim of a substantially complementary shape to the shape of a pad rim of the pad, each elongated body having a radially outer portion;

wherein said rim of the thrust seat comprises an upper boundary which separates the thrust seat from the radially outer portion;

said calliper body having a connection bridge which connects the elongated bodies,     said calliper body comprising at least one reinforcement element which connects said radially outer portion to said connection bridge,     said radially outer portion and said at least one reinforcement element defining a through radial aperture having a maximum length in a circumferential direction and a maximum width in an axial direction, wherein:

the at least one reinforcement element is radially external to the upper boundary; and     the at least one reinforcement element comprises a reinforcement wall having a radial thickness less than the radial thickness of said connection bridge, wherein said at least one reinforcement element at least partially overlies the upper boundary.

\* \* \* \* \*

UNITED STATES PATENT AND TRADEMARK OFFICE
CERTIFICATE OF CORRECTION

PATENT NO. : 9,464,678 B2
APPLICATION NO. : 14/346045
DATED : October 11, 2016
INVENTOR(S) : Andrea Cerutti et al.

It is certified that error appears in the above-identified patent and that said Letters Patent is hereby corrected as shown below:

TITLE PAGE

Page 1, (71) Applicant: change "FRENI BREMBO S.P.A., Bergamo (IT)" to -- FRENI BREMBO S.P.A., Curno, Bergamo (IT) --.

Page 1, (72) Inventors: change "Andrea Cerutti, Bergamo (IT); Davide D'Alessio, Bergamo (IT)" to -- Andrea Cerutti, Curno, Bergamo (IT); Davide D'Alessio, Curno, Bergamo (IT) --.

Page 1, (73) Assignee: change "FRENI BREMBO S.P.A., Curno (IT)" to -- FRENI BREMBO S.P.A., Curno, Bergamo (IT) --.

Signed and Sealed this
Sixth Day of December, 2016

Michelle K. Lee
*Director of the United States Patent and Trademark Office*